(12) United States Patent
Raccurt et al.

(10) Patent No.: US 8,342,207 B2
(45) Date of Patent: Jan. 1, 2013

(54) MAKING A LIQUID/LIQUID OR GAS SYSTEM IN MICROFLUIDICS

(75) Inventors: Olivier Raccurt, Lyons (FR); Yves Fouillet, Voreppe (FR)

(73) Assignee: Commissariat a l'Energie Atomique, Paris (FR)

( * ) Notice: Subject to any disclaimer, the term of this patent is extended or adjusted under 35 U.S.C. 154(b) by 1164 days.

(21) Appl. No.: 12/066,840

(22) PCT Filed: Sep. 22, 2006

(86) PCT No.: PCT/EP2006/066629
§ 371 (c)(1),
(2), (4) Date: Mar. 14, 2008

(87) PCT Pub. No.: WO2007/033990
PCT Pub. Date: Mar. 29, 2007

(65) Prior Publication Data
US 2009/0127123 A1 May 21, 2009

(30) Foreign Application Priority Data

Sep. 22, 2005 (FR) ...................................... 05 09693

(51) Int. Cl.
*F15C 3/00* (2006.01)
(52) U.S. Cl. ......... 137/833; 204/279; 205/334; 137/806
(58) Field of Classification Search .................. 204/279; 205/334; 137/806, 833
See application file for complete search history.

(56) References Cited

U.S. PATENT DOCUMENTS

| | | |
|---|---|---|
| 5,659,330 A | 8/1997 | Sheridon |
| 2004/0196525 A1 | 10/2004 | Fujii et al. |
| 2006/0194331 A1* | 8/2006 | Pamula et al. ................ 436/150 |

FOREIGN PATENT DOCUMENTS

EP 1 293 807 3/2003

OTHER PUBLICATIONS

Agarwal, et al., "Polymer-based variable focal length microlens system", Journal of Micromechanics and Microengineering, vol. 14, No. 12, pp. 1665-1673, 2004.

* cited by examiner

*Primary Examiner* — J. Christopher Ball
(74) *Attorney, Agent, or Firm* — Oblon, Spivak, McClelland, Maier & Neustadt, L.L.P.

(57) ABSTRACT

The invention relates to a microfluidic device for making a liquid/liquid or gas biphasic system using a first liquid or a gas and a second liquid, non-miscible with each other, the device having a first hydrophobic surface for the second liquid, the first liquid forming a layer (6) on said first hydrophobic surface. The device comprises means for introducing a drop (7) of the second liquid into the layer of first liquid or gas and in contact with said first hydrophobic surface, and means for displacing the drop on said first hydrophobic surface along a determined path, the device having on the path of the drop, at least one wetting defect causing, upon passing of the drop over this defect, failure of the triple line of contact of the drop on the first hydrophobic surface and inclusion of first liquid (8) or gas into the drop.
The invention also relates to the associated method.

25 Claims, 12 Drawing Sheets

Figure 5:
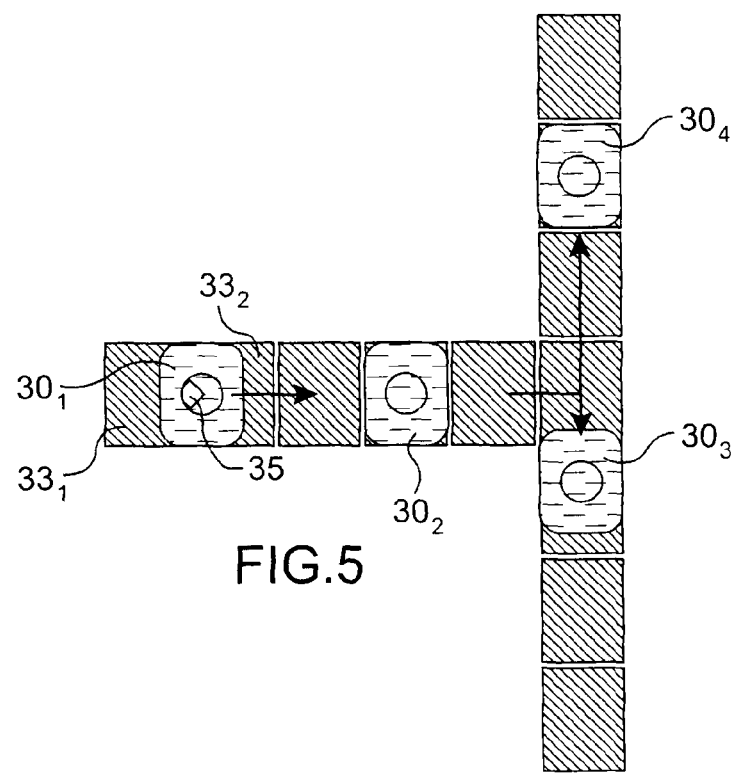

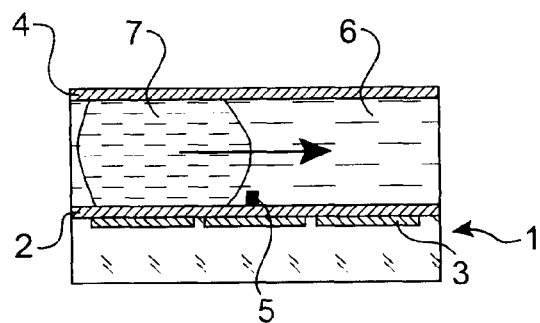
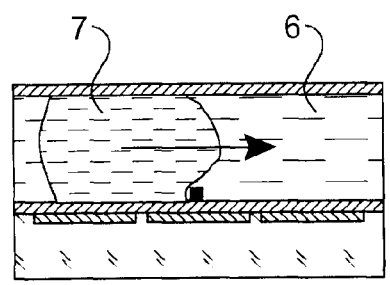
FIG.1A　　　　　　FIG.1B
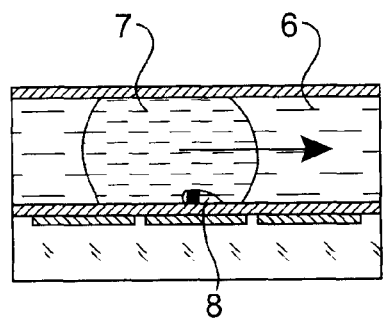
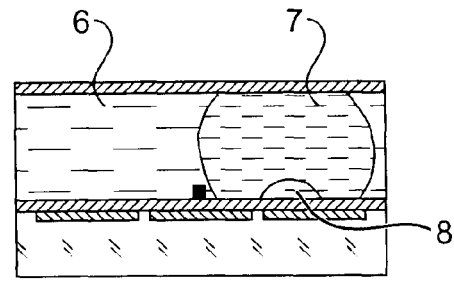
FIG.1C　　　　　　FIG.1D
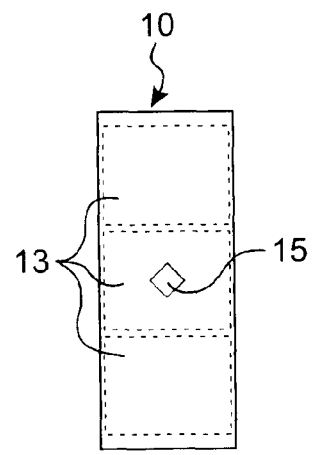
FIG.2

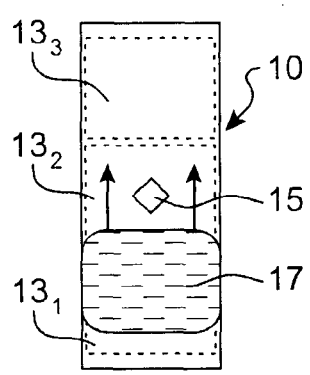 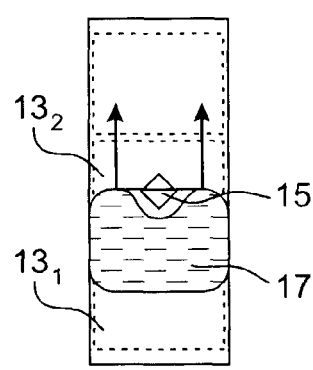 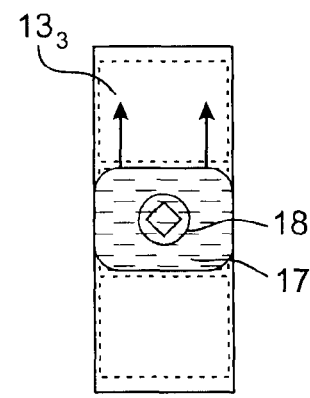
FIG.3A    FIG.3B    FIG.3C
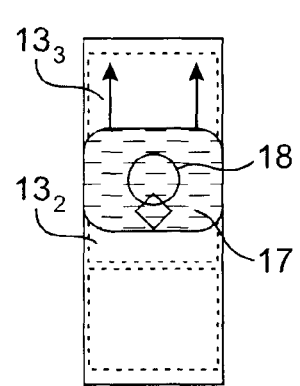 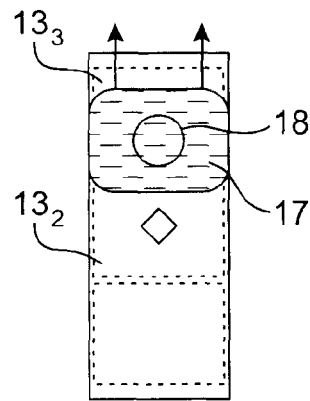 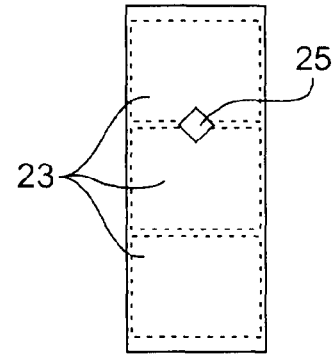
FIG.3D    FIG.3E    FIG.4

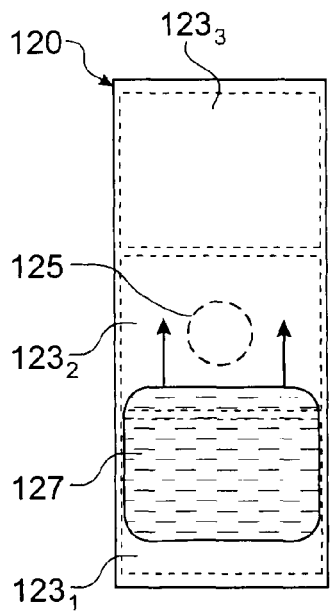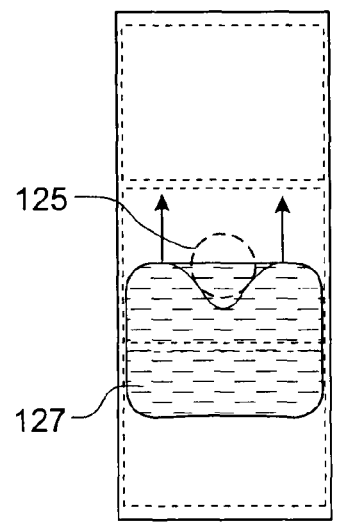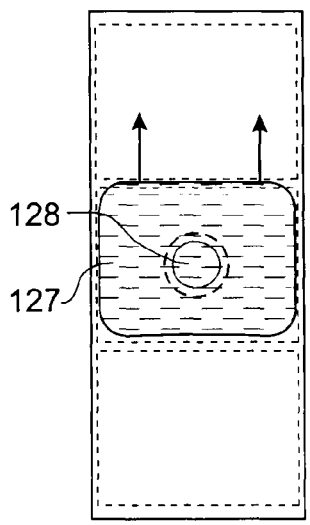
FIG.11A  FIG.11B  FIG.11C
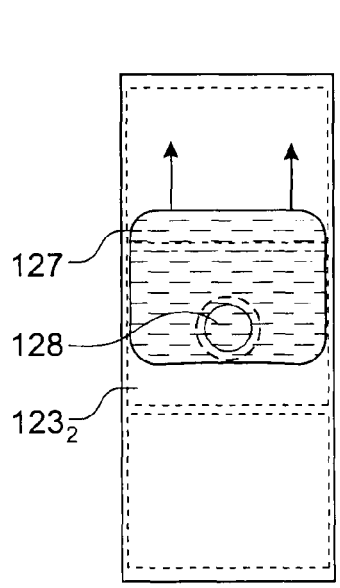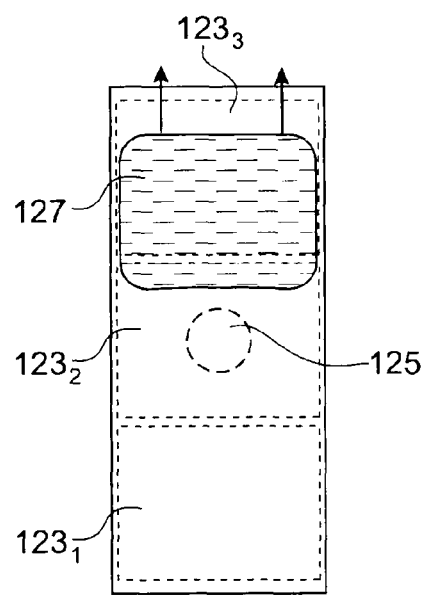
FIG.11D  FIG.11E

MAKING A LIQUID/LIQUID OR GAS SYSTEM IN MICROFLUIDICS

TECHNICAL FIELD

The invention relates to the making of a liquid/liquid or gas biphasic system in microfluidics.

With such a device liquid lenses with variable focal length may notably be made.

STATE OF THE PRIOR ART

Presently, liquid lenses are made by directly injecting oil in water. It seems that there is no microfluidic method for making such a type of inclusion. An explanation of the operation of a liquid lens with a variable focal length is given in the document, <<Variable focal lens controlled by an external voltage: An application of electro-wetting >> of B. BERGE AND J. PESEUX, Eur. Phys. J. E3, 159-163 (2000). However, this document discloses a macroscopic embodiment.

Lenses with variable focal length made in microtechnologies generally use the deformation of solid or liquid membranes by increase or decrease in pressure. On the subject of this technique, reference may be made to the following documents:

<<Tunable microdoublet lens array >> of Ki-Hun JEONG et al., Optics Express, Vol. 12, No. 11, p. 2494-2501, May 31, 2004;

<<Polymer-based variable focal length microlens systems >> of M. AGARWAL et al., J. Micromech. Microeng., Vol. 14, 2004, p. 1665-1673;

<<Variable-focusing microlens with microfluidic chip >> of J. CHEN et al., J. Micromech. Microeng., Vol. 14, 2004, p. 675-680;

<<A variable focus lens with 1 kHz bandwidth applied to axial-scan of a confocal scanning microscope >> de H. OKU et al., Proceedings of the $16^{th}$ Annual Meeting of the IEEE Lasers & Electro-optics Society (LEOS) 2003, Tucson, USA, Oct. 26-30, 2003.

SUMMARY OF THE INVENTION

The present invention proposes a device for making a liquid/liquid or gas biphasic system, the particularity of which is that it may be made by microtechnologies. With this device, it is notably possible to make a liquid lens with a variable focal length. It may however be used for other purposes, i.e. in the cases when it is necessary to form an inclusion of a liquid or gas in a drop of another liquid.

The object of the invention is therefore a microfluidic device for making a liquid/liquid or gas biphasic system using a first liquid or a gas and a second liquid, non-miscible with each other, the device having a first hydrophobic surface for the second liquid, the first liquid forming a layer on said first hydrophobic surface, the device comprising means for introducing a drop of the second liquid into the first liquid or gas layer and in contact with said first hydrophobic surface, and means for displacing the drop of the second liquid over said first hydrophobic surface according to a determined path, the device having on the path of the drop of the second liquid, a wetting defect causing, upon passing of the drop over this defect, failure of the triple line of contact of the drop on the first hydrophobic surface and inclusion of first liquid or gas into the drop of the second liquid.

According to a first embodiment, the means for displacing the drop of the second liquid are electrical activation means providing an electro-wetting effect. The electrical activation means may comprise a succession of electrodes comprised in or on a support having a dielectric layer, a surface of which forms the first hydrophobic surface, the succession of electrodes being positioned along said determined path. The device may comprise a second hydrophobic surface positioned facing the first hydrophobic surface so as to form a closed or confined system for the first liquid or gas layer. The electric activation means may comprise a counter-electrode comprised in or deposited on an insulating support, a surface of which forms the second hydrophobic surface, the counter-electrode being positioned along said determined path. The wetting defect may be a topological defect present on the first hydrophobic surface, for example a protrusion, a hole or a rough area. This may be a wetting defect of the first hydrophobic surface. The wetting defect may be a permanent defect produced on the first hydrophobic surface or a momentary defect caused on the first hydrophobic surface. It may result from the presence of an additional electrode in the succession of electrodes or from the absence of an electrode in the succession of electrodes.

According to a second embodiment, the means for displacing the drop of the second liquid are means exerting mechanical action on the drop of the second liquid. They may comprise a pump. The wetting defect may be a topological defect present on the first hydrophobic surface, for example a protrusion, a hole or a rough area, causing failure of the triple line of the drop of the second liquid, thereby creating an inclusion of the first liquid in said drop of the second liquid. This may be a wetting defect of the first hydrophobic surface. The wetting defect may be a permanent defect produced on the first hydrophobic surface or a momentary defect caused on the first hydrophobic surface. The device may comprise a second hydrophobic surface positioned facing the first hydrophobic surface so as to form a closed or confined system for the first liquid or gas layer.

The device may comprise a second hydrophobic surface positioned facing the first hydrophobic surface so as to form a closed or confined system for the second liquid drop, the first hydrophobic surface and the second hydrophobic surface also confining said first liquid and a third liquid, non-miscible with each other, the second hydrophobic surface also having a wetting defect positioned relatively to the wetting defect of the first hydrophobic surface, to the first liquid and to the third liquid so that the passing of the drop of the second liquid over the wetting defects causes the inclusion of first liquid and the inclusion of third liquid into the drop of the second liquid. According to a first embodiment, the first liquid and the third liquid are positioned in succession in the device, relatively to the passage of the drop of second liquid, the first liquid being in contact with the wetting defect of the first hydrophobic surface, the third liquid being in contact with the wetting defect of the second hydrophobic surface. According to a second embodiment, the first liquid and the third liquid are positioned, superposed, in the device, the drop of second liquid simultaneously passing into the first liquid and the third liquid, the first liquid being in contact with the wetting defect of the first hydrophobic surface, the third liquid being in contact with the wetting defect of the second hydrophobic surface.

According to an alternative embodiment, said at least one wetting defect is formed by a hole in one of the electrodes. The device may then comprise several holes in one of the electrodes, the holes forming as many wetting defects and being positioned according to a matrix arrangement.

According to another alternative embodiment, said at least one wetting defect is formed by an additional electrode positioned inside one of said electrodes and without any electric contact therewith. The device may then comprise several additional electrodes inside one of said electrodes and without any electric contact therewith, said additional electrodes forming as many wetting defects and being positioned according to a matrix arrangement.

The object of the invention is also a method for making a liquid/liquid or gas biphasic system using a first liquid or a gas and a second liquid, non-miscible with each other, comprising:

forming a first liquid or gas layer on a first hydrophobic surface, introducing a drop of the second liquid within the first liquid or gas and in contact with said first hydrophobic surface, displacing the drop of the second liquid over said first hydrophobic surface according to a determined path so that the drop of the second liquid encounters a wetting defect causing, upon the passing of the drop of the second liquid over this defect, failure of the triple line of contact of the drop of the second liquid on the first hydrophobic surface and inclusion of first gas or liquid into the drop of the second liquid.

SHORT DESCRIPTION OF THE DRAWINGS

Figure 6:
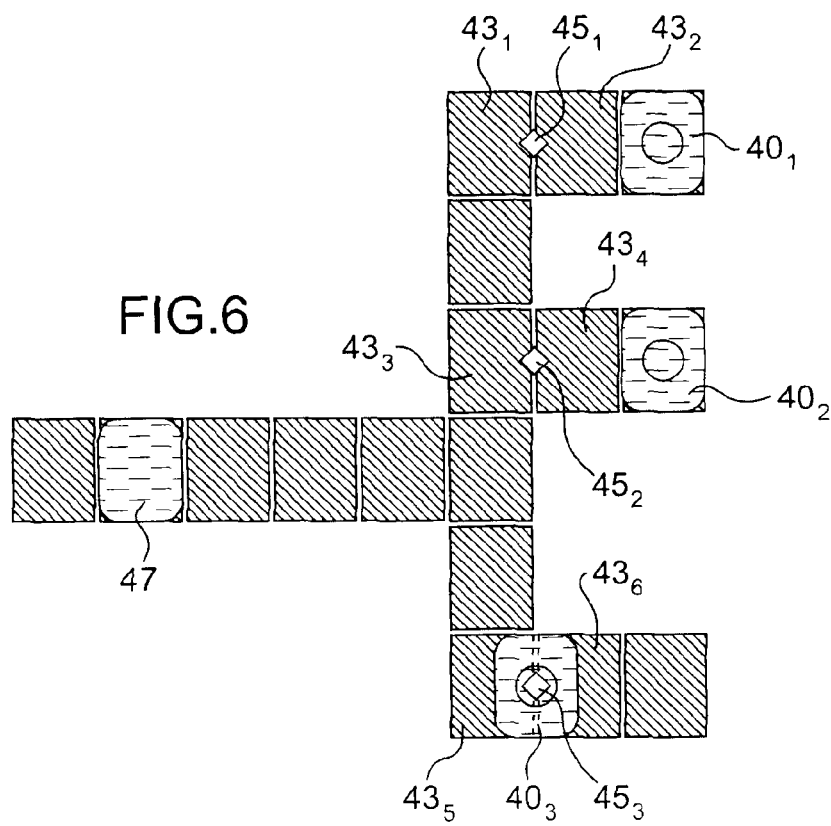
Figure 7A:
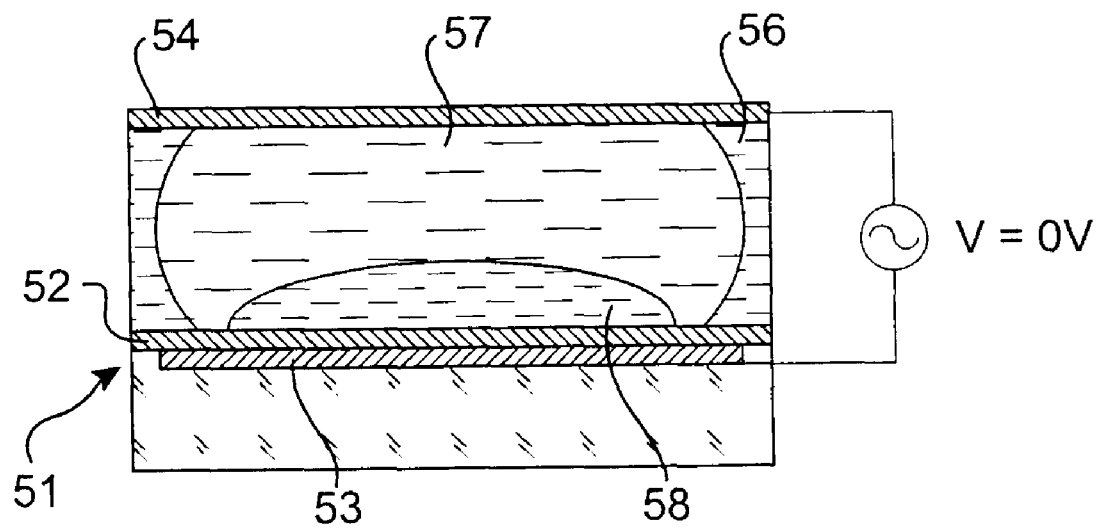
Figure 7B:
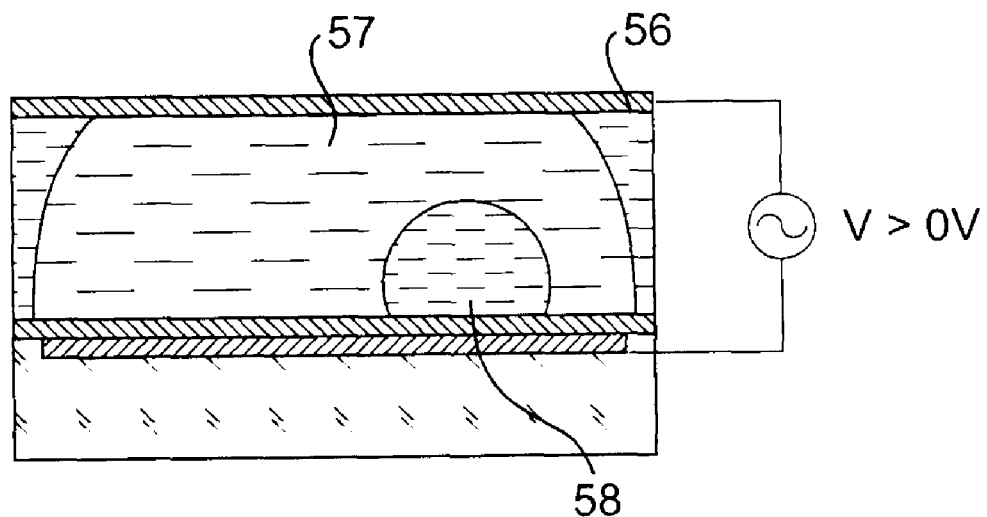
Figure 8A:
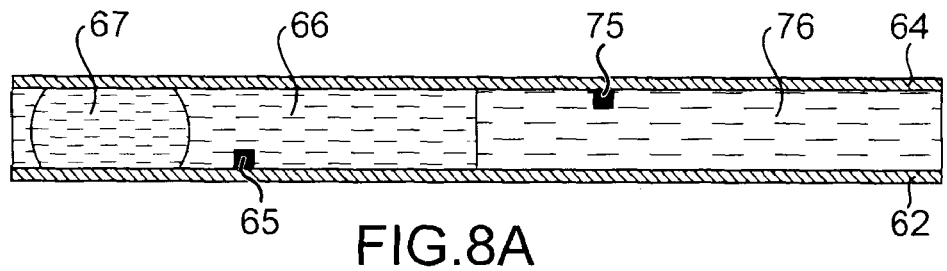
Figure 8B:
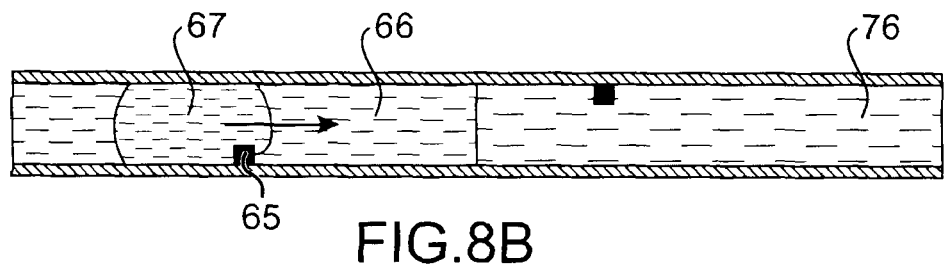
Figure 8C:
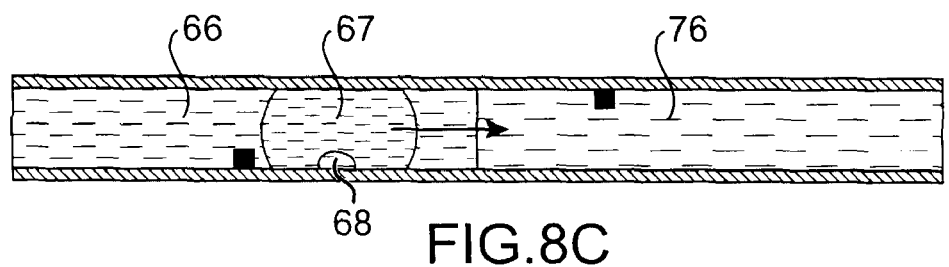
Figure 8D:
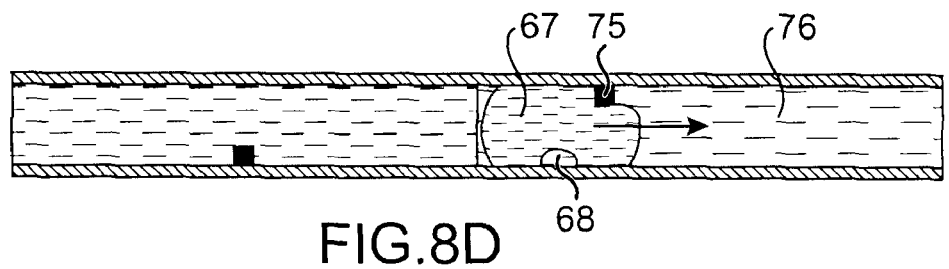
Figure 8E:
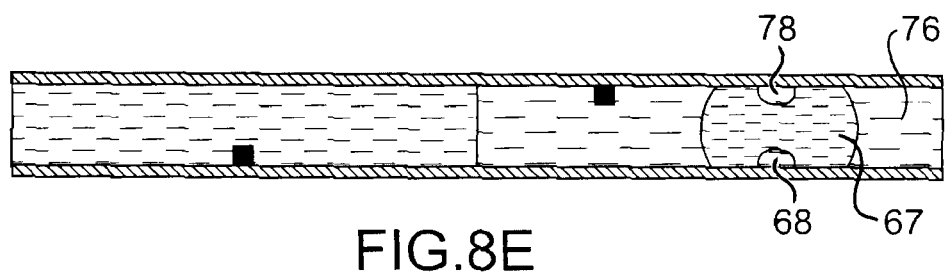
Figure 9A:
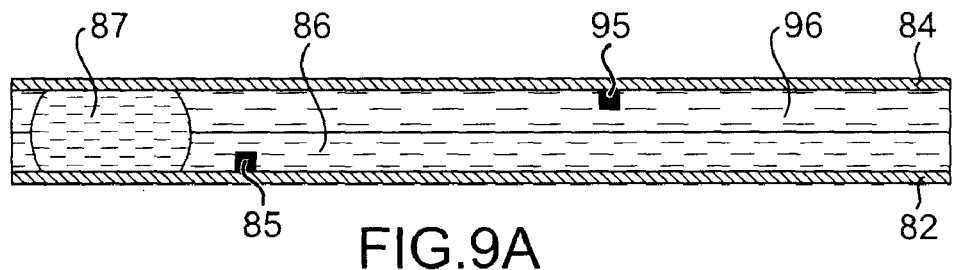
Figure 9B:
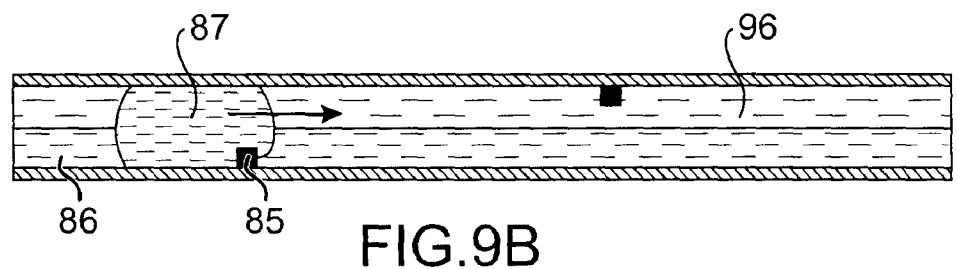
Figure 9C:
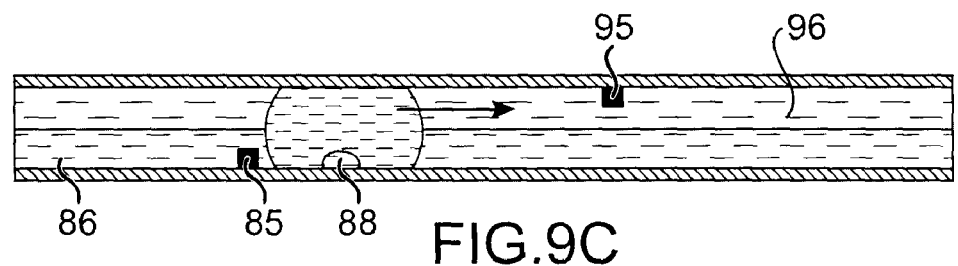
Figure 9D:
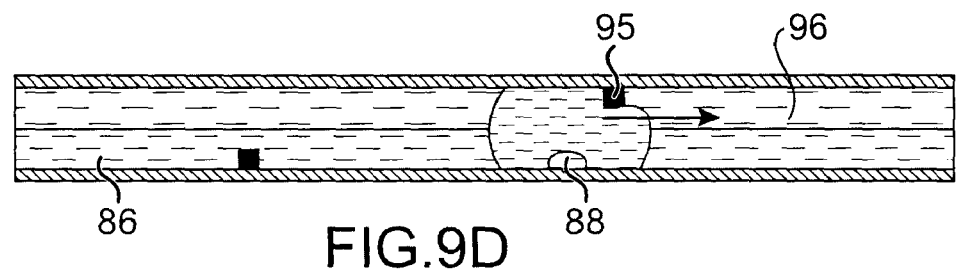
Figure 9E:
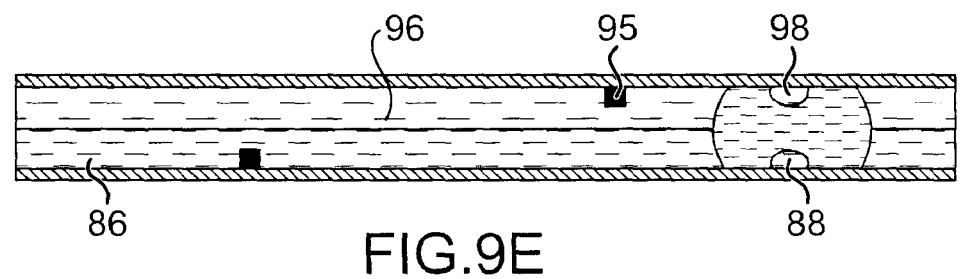
Figure 10A:
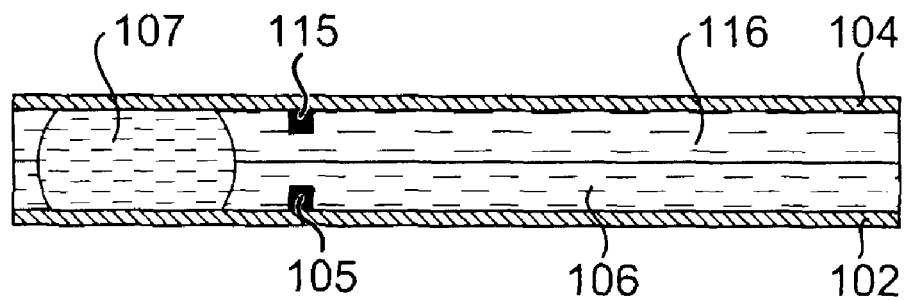
Figure 10B:
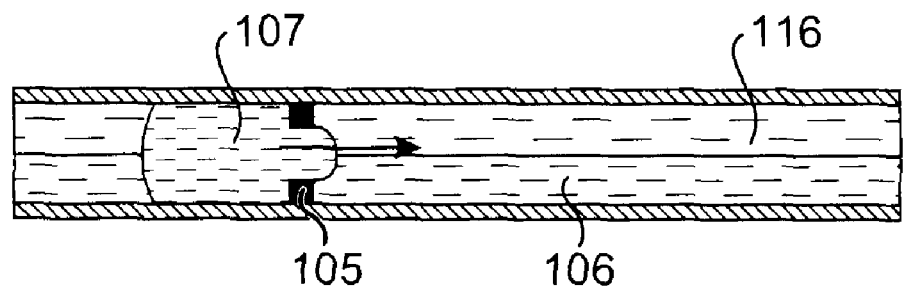
Figure 10C:
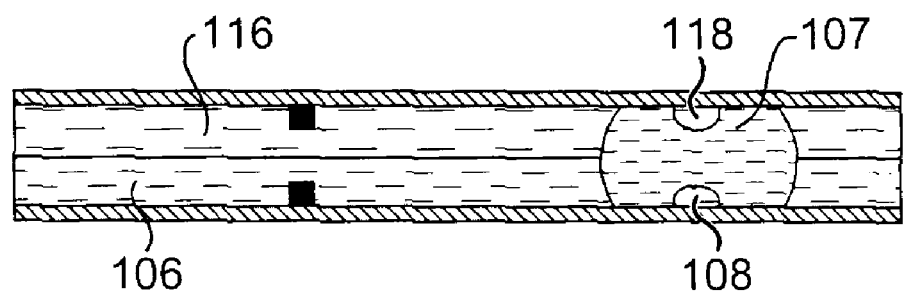
Figure 12A:
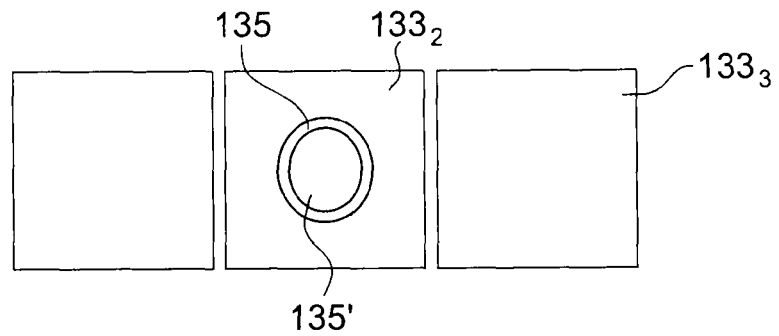
Figure 12B:
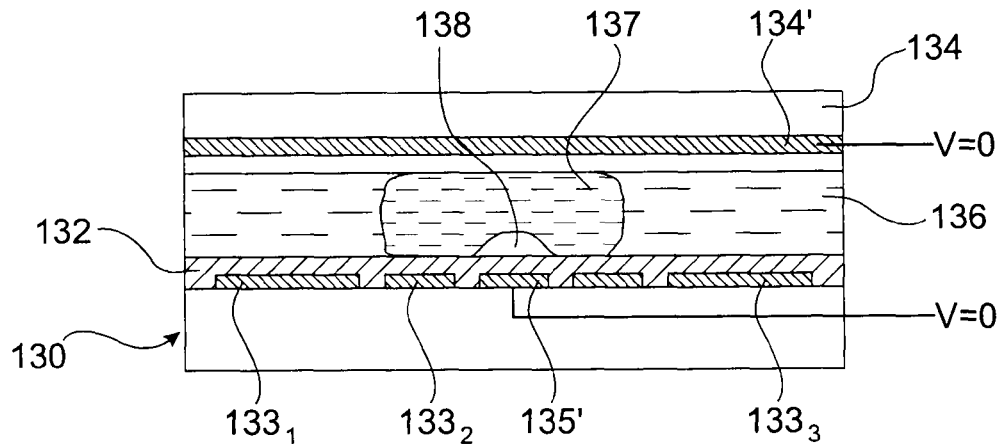
Figure 12C:
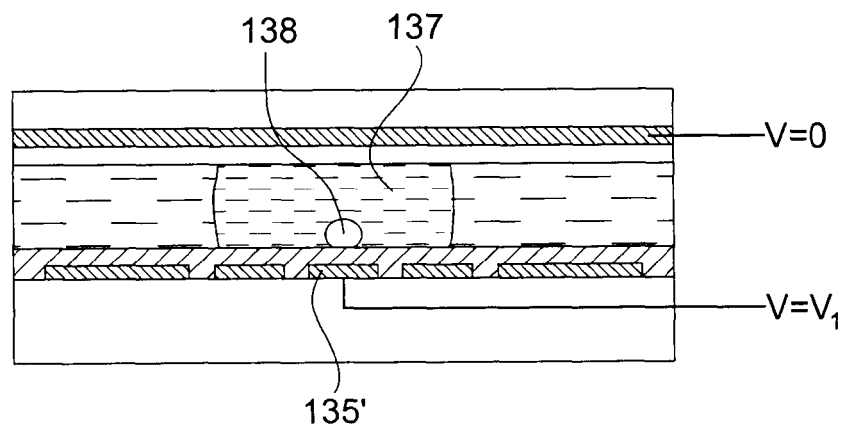
Figure 13A:
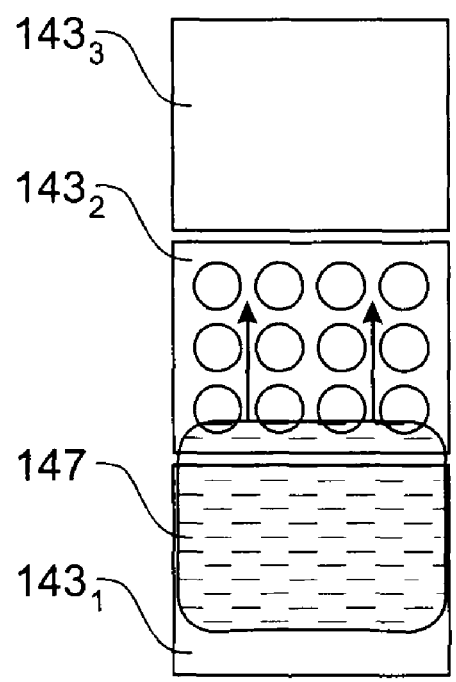
Figure 13B:
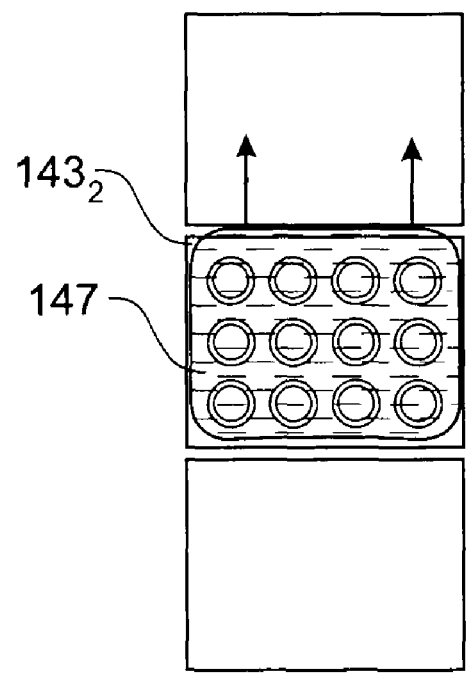
Figure 14A:
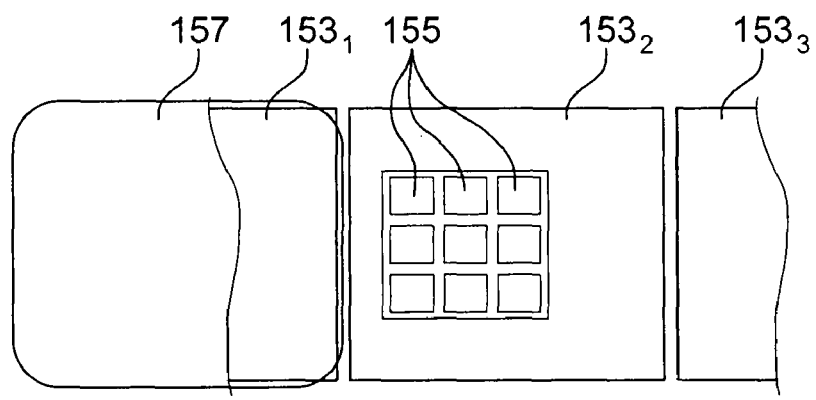
Figure 14B:
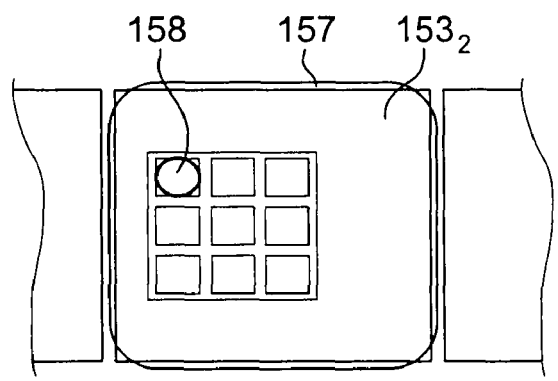
Figure 14C:
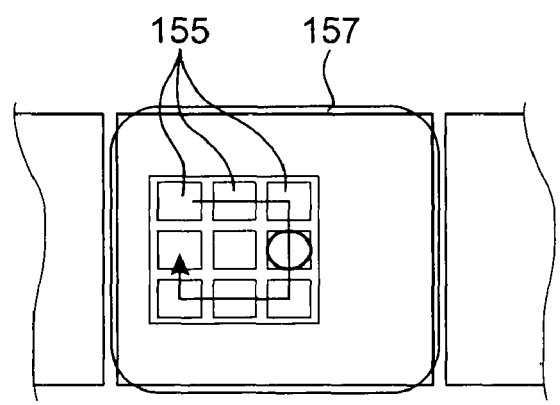
Figure 15:
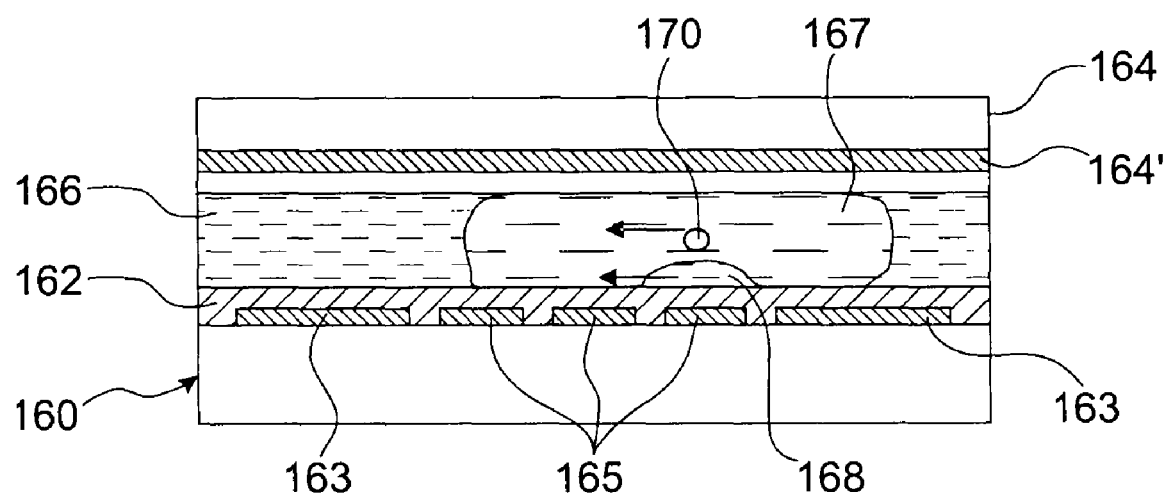

The invention will be better understood and other advantages and particularities will become apparent upon reading the description which follows, given as a non-limiting example, accompanied by the appended drawings wherein:

FIGS. 1A-1D are transverse sectional views of a device according to the invention, when it operates, FIG. 2 is a top view of a supporting substrate which may be used for making a device according to the invention, FIGS. 3A-3E are top views of a device according to the invention, when it operates, FIG. 4 is a top view of another supporting substrate which may be used for making a device according to the invention, FIG. 5 is a top view of a device according to the invention, this device allowing the making of several liquid lenses with a single making cell, FIG. 6 is a top view of a device according to the invention, this device allowing the making of several liquid lenses with several making cells, FIGS. 7A and 7B are transverse sectional views of an elementary cell of electronic paper, FIGS. 8A-8E are transverse sectional views of a device allowing a double inclusion according to the invention, when it operates, FIGS. 9A-9E are transverse sectional views of another device allowing double inclusion according to the invention, when it operates, FIGS. 10A-10C are transverse sectional views of still another device allowing double inclusion according to the invention, when it operates, FIGS. 11A-11E are top views of a device according to the invention when it operates, FIG. 12A is a top view of a device according to the invention and FIGS. 12B and 12C are transverse sectional views of this device when it operates, FIGS. 13A and 13B are top views of the device according to the invention, with which a matrix of inclusions may be made, when it operates, FIGS. 14A-14C are top views of a device according to the invention when it operates, FIG. 15 is a transverse sectional view of a device according to the invention with which beads may be displaced by a driving effect.

DETAILED DISCUSSION OF PARTICULAR EMBODIMENTS

In the microfluidic device according to the present invention, the displacement of the drop on the surface of the supporting substrate may be achieved in different ways. For example, a pump system may be used. In the following of the description, the invention will be applied by means of a device utilizing the electro-wetting effect on a dielectric, or EWOD (<<Electro-Wetting On Dielectric) effect.

FIGS. 1A-1D are transverse sectional views of a device according to the invention using the EWOD effect.

FIG. 1A shows a supporting substrate 1 consisting of one or two layers 2 in a dielectric and hydrophobic material under which electrodes 3 are positioned in succession along a path. A cover 4 is positioned above the supporting substrate 1 and parallel to the supporting substrate. The cover 4 and the supporting substrate 1 define together a confinement space. The cover 4 is covered, on the inside of the device, with an electrically conducting layer and a hydrophobic layer which is in contact with the liquids.

The supporting substrate 1 includes, on the inside of the device, a wetting defect 5. It should be noted that the wetting defect may be on the cover 4, on the inside of the device.

The confinement space of the device is filled with a first liquid forming a layer 6 in this space. A drop 7 of a second liquid, non-miscible in the first liquid, is positioned in the layer 6, hemmed in between the supporting substrate 1 and the cover 4. As an example, the first liquid may be oil and the second liquid, water. The first liquid may also be replaced with a gas such as air.

The displacement of the drop is performed by successive activation of the electrodes, by using the electro-wetting effect: the hydrophobic surface becomes hydrophilic above the electrode when an electric field is applied.

Formation of the oil inclusion in the drop of water is performed in the following way, in connection with FIGS. 1A-1D. When the drop 7, which is displaced in the direction of the arrow, passes over the defect 5, failure of the triple line of contact of the drop on the surface of the supporting substrate occurs, which causes the creation of an inclusion 8 of the ambient medium (oil) in the drop of water. The size of the inclusion may be controlled by the shape of the defect, by the displacement velocity of the drop, by the interfacial tension and the viscosity ratio between both liquids, as well as by the apparent contact angle of the drop on the surface of the substrate and on the defect. The defect may appear as a physical shape (a protrusion like in FIGS. 1A-1D) or as a wetting defect (a hydrophobic portion in the middle of a hydrophilic surface).

With this device, it is possible to make inclusions at will and in a reproducible way. Indeed, the volume of the inclusion may be perfectly controllable by the parameters mentioned earlier. Moreover, it is known how to form a drop in a closed system in oil with very good control of the volume.

A particularly interesting application of the invention is the serial making of liquid lenses for microtechnological devices.

The methods for making the device are those usually used for making EWOD devices, i.e. essentially, but not exclusively, microtechnologies such as deposition of thin layers, photolithography, etching, etc. . . . The technologies usually used for making microfluidic devices also represent a possible embodiment of such a device.

More specifically, the device requires the use of a planar support so that it may be made. The support should be stiff or stiffened when making the inclusions in order to guarantee its flatness and control the characteristic dimensions of the device such as the spacing and size of the electrodes, the spacing between the dielectric and hydrophobic 2 layer (se FIG. 1A) and the cover 4. As an example, the layer 2 may be a silicon, glass or plastic wafer, but not exclusively. In the case of a silicon or glass support, techniques from microtechnologies (photolithography, deposition, etching, etc. . . . ) are directly applicable. In the case of other supports, alternative technologies may be used insofar that they allow the desired result to be obtained.

More particularly concerning the nature of the defect and the method for making it, the latter may either be a defect of topological nature (geometrical) or a wetting defect of the surface in contact with the drop.

In the case when the defect is of a topological nature, the latter may either represent a local raised area with respect to the surface of the hydrophobic dielectric layer as illustrated in FIGS. 1A-1D, or a hole. The important feature of the defect is that it generates a failure of the triple line of contact of the drop on the surface including the wetting defect during the passing of the drop. With this failure of the triple line, a drop of liquid 6 may be entrapped within the drop 7 thereby forming an inclusion 8.

In the case of a defect of topological nature, the embodiment may use photolithography techniques coupled with deposition and etching techniques or, in the case of a local raised area, direct transfer of the defect by adhesive bonding of the latter. In the case of a hole, dry or wet etching techniques coupled with photolithography or else by direct machining may be contemplated.

It is possible to consider the topological defect as a significant increase in surface roughness causing a sufficient increase in the contact angle and therefore local failure of the triple line between the first liquid, the second liquid and the substrate (at the defect) during the passing of the drop.

The shape and the hydrophilic or hydrophobic nature of the defect should allow control of the volume of the inclusion as well as the displacement velocity of the drop in the device.

It is possible to obtain the same effect by using a wetting defect rather than a topological defect. In this case, the wetting defect is characterized by an area of different wettability in close vicinity around the defect. That is to say that the contact angle of the drop at this location, i.e. at the wetting defect, should be larger than the contact angle around the defect, for example larger than 90° whereas around it, it should be much less than 90° during the passing of the drop. It is possible to obtain this difference in wettability by permanently changing the chemical nature of the surface at this location in order to make it hydrophobic. In this case, the defect should remain sufficiently hydrophobic even in the presence of the activation voltage of the electrodes during the displacement of the drop by electro-wetting. This may also be achieved by a specific electrode pattern providing an electrode specific to the defect, included in the electrode providing displacement or even absence of an electrode.

It is also possible to create a wetting defect by an external action such as the local increase or decrease in temperature (a change in the interfacial tension by varying the temperature) or else by photoactivation of a surface by means of a photosensitive deposit which, when it receives a pulse of light, changes its hydrophilic or hydrophobic nature.

Detaching the triple line locally at the defect may also be devised by causing the surface to vibrate with a piezoelectric element for example. In this case, the piezoelectric element would be set into vibration (piezoelectric effect) in order to create local detachment of the triple line of the drop and thereby create an inclusion of oil.

The location of the wetting defect may be located in the middle of an electrode or between two electrodes.

FIG. 2 is a top view of a supporting substrate 10 which may be used for making a device according to the invention. Electrodes 13 are positioned under the supporting substrate 10. The supporting substrate 10 has a wetting defect 15 localized at the centre of an electrode. The wetting defect 15 may be located on the surface of a hydrophobic dielectric layer deposited on the supporting substrate intended to be in contact with the liquids (case of a defect of topological nature or of a surface wetting defect) or under the hydrophobic dielectric layer (additional electrode or absence of electrode) or both on the substrate and under the supporting substrate (case of a combination of means).

FIGS. 3A-3E are top views of a device according to the invention, when it operates. The cover was omitted for the sake of simplification. The supporting substrate 10 is the one illustrated in FIG. 2. The electrodes are referenced $13_1$, $13_2$ and $13_3$ in the forward movement direction of the drop 17 which is displaced on the supporting substrate within the other liquid. In FIG. 3A, electrical activation causes the drop 17 to pass from the electrode $13_1$ to the electrode $13_2$, at the centre of which the defect 15 is localized. Upon reaching the defect, the triple line of contact of the drop on the hydrophobic surface is broken (see FIG. 3B) and a microdrop 18 of the liquid layer is included in the drop 17 which continues its progression towards the electrode $13_3$ (see FIG. 3C). FIGS. 3D and 3E show the drop 17 progressing towards the electrode $13_3$ while carrying away the inclusion as the microdrop 18.

FIG. 4 is a top view of another supporting substrate 20 which may be used for making a device according to the invention. Electrodes 23 are positioned under the supporting substrate 20. The supporting substrate 20 has a wetting defect 25 this time localized between two successive electrodes 23. As earlier, the defect may be present under the supporting substrate, on the supporting substrate or both under and above it.

The first advantage of the invention is to be able to make an inclusion of a first liquid in a drop of a second liquid itself immersed in the first liquid, so that the basic element for making a liquid lens with a variable focal length may thereby be created.

The making is carried out by the device itself, which is an enormous advantage notably for making liquid lenses in a large amount. This making device may be produced with microtechnologies thereby allowing it to be miniaturized. It may thus be inserted into a microfluidic device, as a portion of a more complete optical system device including liquid lenses with variable focal length. On the other hand, the method for making the inclusion forming the liquid lens only depends on the geometry, on the materials, on the design of the device and of course on the two non-miscible liquids used. This means that for a device and a couple of given liquids, it is possible to have very good reproducibility in making these inclusions. Finally, with the system, it is possible to make as many inclusions as wanted and a priori the volume as wanted. Indeed, the latter is controlled by adjustable parameters such as the displacement velocity, the contact angle during the displacement, the difference in contact angles between the defect and its close vicinity and finally the morphology of the defect.

The first application of this device relates to the making of liquid lenses with variable focal length, as described in the article of BERGE and PESEUX mentioned earlier. These devices consist of a drop of oil entrapped in water (or vice versa) the shape of which (and therefore the focal length) is varied by changing the angle contact of the drop by electro-wetting. With the invention described here, it is possible to make the basic element of these lenses with variable focal length (a drop of a first liquid entrapped in a larger drop of a second liquid itself immersed in the first liquid).

With this device, it is possible to make at will as many liquid lenses as wanted, because it is the actual component which controls the size of the inclusion and of the drop by the shape and the nature of the defect, the displacement velocity, the type of surface, etc. . . .

In this case, if the intention is to make one or more liquid lenses or identical inclusions, it is sufficient:
  either to have several drops pass through a same device in order to form as many lenses as desired. These lenses are then brought to the suitable locations by displacing the large drop by electro-wetting as described in the EWOD technologies known to one skilled in the art;
  or to place a making device as described in FIGS. 1A-1D, 2 and 4, on the chip just before the location where the lens with variable focal length should operate.

FIG. 5 is a schematic top view of a device according to the invention with which several liquid lenses may be made with a single making cell, as indicated above. In this figure, for the sake of simplification, only the electrodes 33 positioned under the supporting substrate and a wetting defect have been illustrated. A cell for making liquid lenses is achieved by the presence of a wetting defect 35 between two electrodes $33_1$ and $33_2$. FIG. 5 shows the formation of a liquid lens with a variable focal length $30_1$ during its making. A liquid lens $30_2$, just made before the liquid lens $30_1$, is in progress. The liquid lenses may be directed towards a first direction (the one corresponding to the liquid lens $30_3$) or a second direction (the one corresponding to the liquid lens $30_4$).

FIG. 6 is a schematic top view of a device according to the invention with which several liquid lenses may be made with several making cells as indicated above. In this figure, for the sake of simplification, only the electrodes 43 positioned under the supporting substrate and wetting defects 45 have been illustrated. The wetting defects $45_1$, $45_2$ and $45_3$ are localized between electrodes, $43_1$ and $43_2$, $43_3$ and $43_4$, $43_5$ and $43_6$, respectively. They form as many making cells. The drops of liquid 47 advance by electro-wetting on the path which is assigned to them, and pass into one of the three making cells. FIG. 6 shows two already made liquid lenses with a variable focal length $40_1$ and $40_2$ and a third liquid lens $40_3$ being made.

Another interesting application of this device is the making of elementary cells for what is called electronic paper operating with drops of colored (red, blue and yellow) liquid in another non-miscible and colorless liquid phase, the shape of which is varied in order to cause transmission (or reflection) of the light arriving on the drop. As regards the electronic paper, reference may be made to articles <<Demonstration of fluorescent RGB electro-wetting devices for light wave-coupling displays >> of J. HEIKENFELD et al., Proc. Electroluminescence 2004, p. 302-305, Toronto, Canada, September 2004, and <<Video-speed electronic paper based on electro-wetting >> of R. A. HAYES et al., Nature, Vol. 425, Sep. 25, 2003. Variation of the shape of the drop uses electro-wetting: if the drop is spread out, the cell appears to be in color, if it is retracted, the cell has no color.

Like for the lenses with variable focal length, with the present invention, it is possible to make the drop system in a reproducible and controlled way in order to then go and place them at the desired location by means of an electrode matrix and thereby form the elementary cells of these devices. Such an elementary cell is illustrated in FIGS. 7A and 7B.

The <<electronic papers >> are formed with a matrix of these cells which are individually controlled. As the light may come from above or from below, the walls located on the path of the light are transparent.

The cell illustrated in FIGS. 7A and 7B comprises a supporting substrate 51 consisting of a layer 52 in a hydrophobic and dielectric material under which is positioned an electrode 53. A cover 54 is positioned facing the supporting substrate 51 and parallel to the supporting substrate. The cover 54 is on the inside of the cell, covered with an electrically conducting layer and with a hydrophobic layer which is in contact with the first liquid layer 56 and with the second liquid drop 57. The drop 57 comprises an inclusion of liquid 58. The first liquid may be oil, the second liquid may be water. The liquid 58 may be colored oil. The biphasic system 57/58 was made downstream for the cell, in a device according to the invention comprising as a first liquid colored oil forming a layer, the second liquid being water. The biphasic system 57/58 is then conveyed by electro-wetting towards an elementary cell of electronic paper.

In the absence of an electrical voltage applied between the electrode of the cover 54 and the electrode 53, the colored microdrop 58 is spread out and the pixel seems to be colored (FIG. 7A). When an electrical control voltage is applied, the colored oil microdrop 58 retracts and the cell (or pixel) appears colorless (FIG. 7B).

As an example, a method and a device with which an inclusion of a liquid in a drop may be obtained, were shown above. Thus an oil inclusion in a drop of water itself immersed in oil (or any other pair of non-miscible liquids) may thereby be obtained). Now, it is possible to obtain at least two inclusions consisting of two different liquids in the drop (for example a drop of water in an oil bath), having two inclusions of non-miscible liquids inside it such that one inclusion is found at the bottom of the drop, on the lower surface and another inclusion is found at the top, on the upper surface.

Several solutions are possible for obtaining two inclusions in the drop. In all the cases, the means allowing the inclusion need to be present both on the lower internal surface and on the upper internal surface of the device.

According to a first embodiment, illustrated by FIGS. 8A-8E, the double inclusion is obtained by passing in two successive baths of non-miscible liquids. These figures are schematic views with which the operation of the device may be explained.

The device of FIGS. 8A-8E comprise two layers 62 and 64 in a hydrophobic and dielectric material, positioned facing each other and separated by a distance allowing a liquid 66 (for example a first oil) to be confined in the left portion of the device and of a liquid 76 (for example a second oil non-miscible with the first) in the right portion of the device. The lower layer 62 has a wetting defect 65 in the left portion of the device. The upper layer 64 has a wetting defect 75 in the right portion of the device. A drop 67 of another liquid, non-miscible with both oils, for example water, is introduced into the left portion of the device.

The drop 67 is displaced from the left portion towards the right portion of the device (see FIGS. 8B-8D) in order to reach the position illustrated by FIG. 8E. The possible displacement means for the drop were disclosed above and are not illustrated in 8A-8E.

The drop 67 passes at the wetting defect 65 where an inclusion 68 is created on the lower surface. The drop 67 advances towards the liquid 76, penetrates therein and passes at the wetting defect 75 where an inclusion 78 is created on the upper surface. FIG. 8E shows the drop 67 provided with opposite inclusions 68 and 78.

According to another embodiment, the double inclusion is obtained by using two non-miscible liquids with different densities. In this case, it is possible to create two opposite inclusions at the same location of the device or at two different locations of the device.

With the device illustrated by FIGS. 9A-9E two opposite inclusions may be created at two different locations of the device. It comprises two layers 82 and 84 in a hydrophobic and dielectric material, positioned facing each other and separated by a distance allowing a liquid 86 (for example a first oil) to be confined in the lower portion of the device and a liquid 96 (for example a second oil non-miscible with the first and of lower density) to be confined in the upper portion of the device. The lower layer 82 has a wetting defect 85 and the upper layer 84 has a wetting defect 95, both wetting defects being offset from each other in the direction of displacement of the drop 87 which is a liquid, non-miscible with both oils.

The drop 87 is displaced from the left portion towards the right portion of the device (see FIGS. 9B-9D) in order to reach the position illustrated by FIG. 9E. The possible means for displacing the drop were disclosed above and are not illustrated in FIGS. 9A-9E.

The drop 87 passes at the wetting defect 85 where an inclusion 88 is created on the lower surface. The drop 87 then passes at the wetting defect 95 where an inclusion 98 is created on the upper surface. FIG. 9E shows the drop 87 provided with the opposite inclusions 88 and 98.

With the device illustrated by FIGS. 10A-10C, two opposite inclusions may be created at the same location of the device. It comprises two layers 102 and 104 in a hydrophobic and dielectric material, positioned facing each other and separated by a distance allowing a liquid 106 and a liquid 116 to be confined, as for the preceding embodiment. The lower layer 102 has a wetting defect 105 and the upper layer 84 has a wetting defect 115, both wetting defects allowing inclusions to be created at the same level.

The drop 107 is displaced from the left portion towards the right portion of the device (see FIGS. 10A-10C). The possible displacement means for the drop were disclosed above and have not been illustrated in FIGS. 10A-10C.

The drop 107 simultaneously passes at the wetting defects 105 and 115 where inclusions 108 and 118 are created. FIG. 10C shows the drop 107 provided with the opposite inclusions 108 and 118.

The fact of having two opposite inclusions (one at the top and the other at the bottom of the drop) has the advantage that, if two colored oils of different colors are used, a system is obtained with two inclusions of different colors in the same drop. This is of interest for optical systems such as electronic paper.

Another advantage is purely optical: two inclusions located facing each other allow a double lens to be formed. It was seen earlier that an inclusion of a liquid in a drop is used as a basic system for liquid lenses with a variable focal length. With such a device, both inclusions form two lenses, the focal length of which may be varied by an electro-wetting device. Variation of the focal length of each inclusion by electro-wetting may be accomplished in an identical way or independently.

The exemplary embodiments described above mention a displacement of the inclusion after its formation. However, depending on the nature of the defect and on the liquid used, the inclusion may remain fixed after its formation. The inclusion in this case is automatically positioned on the defect. It disappears when the drop is again displaced on another electrode.

FIGS. 11A-11E are top views of a device according to the invention wherein the wetting defect is a circular hole provided in one of the electrodes. The cover has been omitted for the sake of simplification. The supporting substrate 120 in an integrated way as earlier, supports electrodes, only three of which are illustrated: the electrodes $123_1$, $123_2$ and $123_3$. The electrode $123_2$ has a central circular hole 125 forming the wetting defect. The drop 127 is displaced from the electrode $123_1$ (see FIG. 11A) towards the electrode $123_3$ (see FIG. 11E) within the other liquid. Upon reaching the defect, a microdrop 128 of the surrounding liquid layer is included in the drop 127 (see FIG. 11C). As the drop 127 continues its displacement (see FIG. 11D), the microdrop 128 remains on the hole 125 of the electrode $123_2$. When the drop 127 passes over the electrode $123_3$, the inclusion has returned to the surrounding liquid layer (see FIG. 11E).

In the case of a defect produced by a hole in an electrode, it is possible to add another electrode in this hole. FIGS. 12A-12C illustrate such a configuration.

FIG. 12A is a top view of a few electrodes of this device. Three electrodes $133_1$, $133_2$ and $133_3$ aligned in the forward movement direction of a drop are seen therein. The electrode $133_2$ has a central circular hole 135 in which is housed an electrode 135' which may be set at a potential different from that of the electrode $133_2$ in order to cause a wetting defect.

FIGS. 12B and 12C are transverse sectional views of the device. A supporting substrate 130 is seen therein, supporting the electrodes $133_1$, $133_2$ and $133_3$ included in a layer 132 in a hydrophobic and dielectric material. A cover 134 including a single electrode 134' set to ground potential (V=0) and a drop 137 of liquid conveyed within a layer of another liquid 136 are also illustrated. FIG. 12B illustrates the drop 137 having reached the electrode $133_2$ causing the inclusion of a microdrop 138 when the electrode 135' is not activated (V=0). The fact of not activating the electrode 135' corresponds to the case when there is no particular electrode, as for the preceding device. The microdrop 138 settles and is automatically centered on the electrode 135'. By activating the electrode 135' (V=V1), as illustrated in FIG. 12C, independently of the other electrodes, the shape of the inclusion 138 may be varied by electro-wetting.

By positioning several wetting defects in a same electrode, a matrix of inclusions may be achieved in a single displacement of the drop. FIGS. 13A and 13B are top views which illustrate this application. In these figures, the supporting substrate has not been illustrated. Three electrodes $143_1$, $143_2$ and $143_3$ aligned in the forward movement direction of a drop are seen therein. The electrode $143_2$ has a matrix of twelve holes (or defects) positioned over three lines and four columns. The drop 147 is displaced from the electrode $143_1$ towards the electrode $143_3$ (see FIG. 13A). FIG. 13B shows the drop 147 positioned on the electrode $143_2$. Passing of the drop 147 on the electrode $143_2$ causes the inclusion of a matrix of microdrops of the surrounding liquid as this is shown in FIG. 13B.

The device illustrated in FIGS. 14A-14C repeats the matrix arrangement of defects of the preceding exemplary application, but by adding an individual electrode at each defect. These electrodes may either be independent or not, i.e. they may be activated independently of each other. In this way, it is possible to selectively activate each thereby formed inclusion. Moreover, by either activating or not the electrodes of the defects during the displacement of the drop, it is possible to select the elements of the matrix of defects where the inclusions will be formed.

In FIGS. 14A-14C, the supporting substrate has not been illustrated. Three electrodes $153_1$, $153_2$ and $153_3$ aligned in the forward movement direction of a drop are seen therein. The electrode $153_2$ has a central aperture in which is positioned a matrix of nine electrodes 155 positioned in three lines and three columns. FIG. 14A shows a drop 157 positioned on the electrode $153_1$, the system for example being immersed in oil. The drop 157 is brought by electro-wetting, close to the electrode $153_2$. The electrode $153_2$ is activated as well as the whole matrix of electrodes 155 except for example one of the electrodes 155. Thus an inclusion of the liquid surrounding the drop 157 is formed, the inclusion being positioned on the non-activated electrode 155. This for example is the microdrop 158 visible in FIG. 14B. By sequentially activating the electrodes 155, it is possible to displace by electro-wetting the microdrop 158 in the drop 157, the electrode $153_2$ remaining either activated or not.

The fact of being able to handle and displace an inclusion of liquid (for example oil) is a novel function which may be applied in different fields. By means of the invention, it is possible to make a matrix of optical lenses on a small surface. This small surface is for example placed facing or above a CCD sensor, and a lens corresponds to each pixel of the sensor. It is also possible to cause mixing in the drop by displacing an inclusion (or several inclusions) in the drop, which causes flow of the fluid of the drop in the latter. By thereby causing mixing, it is possible to promote re-suspension of beads or cells or to avoid the phenomenon of sedimentation. This flow of fluid is controllable by the displacement of the inclusion. Thus, the currents generated in the drop may be used for handling particles or cells present in the drop. Indeed, a particle placed close to or in contact with the inclusion, will be carried away by the fluid set into motion by the displacement of the inclusion. Several particles may be handled and a function for concentrating particles within the drop is thereby obtained.

FIG. 15 is a transverse sectional view of a device with which beads may be displaced by the driving effect of a fluid resulting from the movement of an inclusion. A supporting substrate 160 is recognized therein, supporting i.a. electrodes not shown, an electrode 163 pierced with a central aperture in which are positioned individual electrodes 165. These electrodes 165 may be positioned as a matrix (as in FIG. 14A), as a line or as any other configuration with which a microdrop may be displaced by electro-wetting. The electrodes of the supporting substrate 164 are included in a layer 162 in a hydrophobic and dielectric material. A cover 164 including a single electrode 164' set to ground potential and a drop 167 conveyed within another liquid 166 are also illustrated. A microdrop 168 is included in the drop 167. The displacement of the microdrop 168, by activation/deactivation of the electrodes 165 causes by a driving effect, the displacement of a bead 170 conveyed by the drop 167.

The invention claimed is:

1. A microfluidic device for making a liquid/liquid or liquid/gas biphasic system using a first liquid or a first gas, and a second liquid, non-miscible with each other, the device comprising:
    a first hydrophobic surface,
    a layer of the first liquid or the first gas on said first hydrophobic surface,
    a second hydrophobic surface positioned facing the first hydrophobic surface so as to form a closed or confined system for the first liquid or the first gas layer,
    a drop of the second liquid on said first hydrophobic surface and in the layer of the first liquid or the first gas and at a location along a determined path,
    a displacer to place the drop of the second liquid on said first hydrophobic surface along the determined path, and
    at least one wetting defect on the determined path, wherein the wetting defect causes, upon the passing of the drop of the second liquid on this defect, failure of a triple line of contact of the drop of the second liquid on the first hydrophobic surface and inclusion of an amount of the first liquid or the first gas in the drop of the second liquid,
    wherein the displacer is an electrical activation device that provides an electro-wetting effect.

2. The microfluidic device according to claim 1, wherein the electrical activation device comprises a counter-electrode comprised in or deposited on an insulating support, a surface of which forms the second hydrophobic surface, the counter-electrode being positioned along said determined path.

3. A method for making a liquid/liquid or liquid/gas biphasic system using a first liquid or a first gas, and a second liquid, non-miscible with each other, comprising:
    forming a first liquid layer or a first gas layer on a first hydrophobic surface,
    introducing a drop of the second liquid within the first liquid layer or the first gas layer such that the drop of the second liquid is in contact with said first hydrophobic surface,
    displacing the drop of the second liquid on said first hydrophobic surface along a determined path so that the drop of the second liquid encounters at least one wetting defect, and upon passing of the drop of the second liquid over the defect, failure of a triple line of contact of the drop of the second liquid on the first hydrophobic surface and inclusion of the first liquid or the first gas in the drop of the second liquid occurs.

4. The method according to claim 3, wherein the displacement of the drop of the second liquid is obtained by electrical activation providing an electro-wetting effect.

5. The method according to claim 4, wherein the electrical activation is provided by a succession of electrodes positioned along said determined path.

6. The method according to claim 3, wherein the displacement of the drop of the second liquid is obtained by mechanical action on the drop of the second liquid.

7. The method according to claim 3, wherein the first liquid layer of the first gas layer is formed between said first hydrophobic surface and a second hydrophobic surface positioned facing the first hydrophobic surface so as to form a closed or confined system for the first liquid layer or the first gas layer.

8. The method according to claim 7, wherein the first liquid and a third liquid are formed between the first hydrophobic surface and the second hydrophobic surface, said third liquid being non-miscible with the first liquid and the second liquid.

9. The method according to claim 8, wherein the displacing of the drop of the second liquid along the determined path causes the drop of the second liquid to encounter at least one wetting defect which causes inclusion of the first liquid, and causes the drop of the second liquid to encounter at least one wetting defect which causes inclusion of the third liquid.

10. The method according to claim 9, wherein the first liquid and the second liquid are formed in succession in the biphasic system.

11. The method according to claim 9, wherein the first liquid and the second liquid are formed in superposition in the biphasic system.

12. A microfluidic device for making a liquid/liquid or liquid/gas biphasic system using a first liquid or a first gas, and a second liquid, non-miscible with each other, the device comprising:
a first hydrophobic surface,
a layer of the first liquid or the first gas on said first hydrophobic surface,
a drop of the second liquid on said first hydrophobic surface and in the layer of the first liquid or the first gas and at a location along a determined path,
a displacer to place the drop of the second liquid on said first hydrophobic surface along the determined path, and
at least one wetting defect on the determined path, wherein the wetting defect causes, upon the passing of the drop of the second liquid on this defect, failure of a triple line of contact of the drop of the second liquid on the first hydrophobic surface and inclusion of an amount of the first liquid or the first gas in the drop of the second liquid,
wherein the displacer is a device that exerts mechanical action on the drop of the second liquid.

13. The microfluidic device according to claim 12, wherein the device that exerts mechanical action on the drop of the second liquid comprises a pump.

14. The microfluidic device according to claim 12, wherein the wetting defect is a topological defect present on the first hydrophobic surface.

15. The microfluidic device according to claim 14, wherein the topological defect is a defect selected from the group consisting of a protrusion, a hole and a rough area.

16. The microfluidic device according to claim 12, wherein the wetting defect is a wetting defect of the first hydrophobic surface.

17. The microfluidic device according to claim 12, wherein the wetting defect is a permanent defect produced on the first hydrophobic surface or a momentary defect caused on the first hydrophobic surface.

18. The microfluidic device according to claim 12, comprising a second hydrophobic surface positioned facing the first hydrophobic surface so as to form a closed or confined system for the first liquid or the first gas layer.

19. A microfluidic device for making a liquid/liquid or liquid/gas biphasic system using a first liquid or a first gas, and a second liquid, non-miscible with each other, the device comprising:
a first hydrophobic surface,
a layer of the first liquid or the first gas on said first hydrophobic surface,
a drop of the second liquid on said first hydrophobic surface and in the layer of the first liquid or the first gas and at a location along a determined path,
a displacer to place the drop of the second liquid on said first hydrophobic surface along the determined path, and
at least one wetting defect on the determined path, wherein the wetting defect causes, upon the passing of the drop of the second liquid on this defect, failure of a triple line of contact of the drop of the second liquid on the first hydrophobic surface and inclusion of an amount of the first liquid or the first gas in the drop of the second liquid,
wherein a second hydrophobic surface is positioned facing the first hydrophobic surface so as to form a closed or confined system for the drop of second liquid, the first hydrophobic surface and the second hydrophobic surface also confine said first liquid and a third liquid, non-miscible with each other, the second hydrophobic surface also has a wetting defect positioned relative to the wetting defect of the first hydrophobic surface, to the first liquid and to the third liquid so that the passing of the drop of the second liquid on the wetting defects causes inclusion of the first liquid and inclusion of the third liquid in the drop of the second liquid.

20. The microfluidic device according to claim 19, wherein the first liquid and the third liquid are positioned in succession in the device, relatively to the passing of the drop of the second liquid, the first liquid being in contact with the wetting defect of the first hydrophobic surface, the third liquid being in contact with the wetting defect of the second hydrophobic surface.

21. The microfluidic device according to claim 19, wherein the first liquid and the third liquid are positioned, superposed in the device, the drop of the second liquid simultaneously passing into the first liquid and the third liquid, the first liquid being in contact with the wetting defect of the first hydrophobic surface, the third liquid being in contact with the wetting defect of the second hydrophobic surface.

22. A microfluidic device for making a liquid/liquid or liquid/gas biphasic system using a first liquid or a first gas, and a second liquid, non-miscible with each other, the device comprising:
a first hydrophobic surface,
a layer of the first liquid or the first gas on said first hydrophobic surface,
a drop of the second liquid on said first hydrophobic surface and in the layer of the first liquid or the first gas and at a location along a determined path,
a displacer to place the drop of the second liquid on said first hydrophobic surface along the determined path, and
at least one wetting defect on the determined path, wherein the wetting defect causes, upon the passing of the drop of the second liquid on this defect, failure of a triple line of contact of the drop of the second liquid on the first hydrophobic surface and inclusion of an amount of the first liquid or the first gas in the drop of the second liquid,
wherein the displacer is an electrical activation device that provides an electro-wetting effect, said electrical activation device comprising a succession of electrodes comprised in or on a support having a dielectric layer, a surface of which forms the first hydrophobic surface, the succession of electrodes being positioned along said determined path, and
wherein the at least one wetting defect is formed by a hole in one of the electrodes of the succession of electrodes.

23. The microfluidic device according to claim 22, comprising several holes in one of the electrodes, the holes forming as many wetting defects and being positioned according to a matrix arrangement.

24. A microfluidic device for making a liquid/liquid or liquid/gas biphasic system using a first liquid or a first gas, and a second liquid, non-miscible with each other, the device comprising:
a first hydrophobic surface,
a layer of the first liquid or the first gas on said first hydrophobic surface,
a drop of the second liquid on said first hydrophobic surface and in the layer of the first liquid or the first gas and at a location along a determined path,
a displacer to place the drop of the second liquid on said first hydrophobic surface along the determined path, and
at least one wetting defect on the determined path, wherein the wetting defect causes, upon the passing of the drop of the second liquid on this defect, failure of a triple line of contact of the drop of the second liquid on the first hydrophobic surface and inclusion of an amount of the first liquid or the first gas in the drop of the second liquid,
wherein the displacer is an electrical activation device that provides an electro-wetting effect, said electrical activation device comprising a succession of electrodes comprised in or on a support having a dielectric layer, a surface of which forms the first hydrophobic surface, the succession of electrodes being positioned along said determined path, and wherein the at least one wetting defect is formed by an additional electrode positioned inside one of the electrodes of the succession of electrodes and without any electric contact therewith.

25. The microfluidic device according to claim 24, comprising several additional electrodes inside one of said electrodes and without any electric contact therewith, said additional electrodes forming as many wetting defects and being positioned according to a matrix arrangement.

* * * * *

UNITED STATES PATENT AND TRADEMARK OFFICE
CERTIFICATE OF CORRECTION

PATENT NO. : 8,342,207 B2
APPLICATION NO. : 12/066840
DATED : January 1, 2013
INVENTOR(S) : Olivier Raccurt et al.

It is certified that error appears in the above-identified patent and that said Letters Patent is hereby corrected as shown below:

On the title page, Item (54) and in the specification, column 1, the title is incorrect. It should read:

--MAKING A LIQUID/LIQUID OR GAS BIPHASIC SYSTEM IN MICROFLUIDICS--

Signed and Sealed this
Twenty-third Day of April, 2013

Teresa Stanek Rea
*Acting Director of the United States Patent and Trademark Office*